(12) United States Patent  
Li

(10) Patent No.: US 10,368,004 B2
(45) Date of Patent: Jul. 30, 2019

(54) LIGHT SOURCE CONTROL METHOD AND CAMERA APPARATUS THEREOF

(71) Applicant: VIVOTEK INC., New Taipei (TW)

(72) Inventor: Wen-Yuan Li, New Taipei (TW)

(73) Assignee: VIVOTEK INC., New Taipei (TW)

( * ) Notice: Subject to any disclaimer, the term of this patent is extended or adjusted under 35 U.S.C. 154(b) by 89 days.

(21) Appl. No.: 15/871,095

(22) Filed: Jan. 15, 2018

(65) Prior Publication Data

US 2018/0213138 A1 Jul. 26, 2018

(30) Foreign Application Priority Data

Jan. 26, 2017 (TW) .............................. 106103127 A

(51) Int. Cl.
*H04N 5/235* (2006.01)
*H04N 5/225* (2006.01)
*H04N 5/247* (2006.01)

(52) U.S. Cl.
CPC ......... *H04N 5/2351* (2013.01); *H04N 5/2256* (2013.01); *H04N 5/2354* (2013.01); *H04N 5/247* (2013.01)

(58) Field of Classification Search
CPC .... H04N 5/2351; H04N 5/2256; H04N 5/247; H04N 5/2354
See application file for complete search history.

(56) References Cited

U.S. PATENT DOCUMENTS

2018/0313760 A1* 11/2018 Kramer .............. G01N 21/6456
2018/0321273 A1* 11/2018 Kwon ....................... G01P 5/20

* cited by examiner

*Primary Examiner* — Christopher K Peterson
(74) *Attorney, Agent, or Firm* — Winston Hsu

(57) ABSTRACT

A light source control method is applied to a camera apparatus including a device body, a plurality of image capturers movably disposed on the device body, and a plurality of light sources disposed around the device body. The light source control method includes each image capturer capturing an uncompensated image toward a target region respectively when each light source is turned off, turning on the plurality of light sources by turns, each image capturer capturing a practical image toward the target region when each light source is turned on by turns, and comparing image reference values of the practical images captured by the plurality of image capturers when each light source is turned on by turns with image reference values of the corresponding uncompensated images respectively for controlling turning on or off of each light source respectively.

9 Claims, 4 Drawing Sheets

LIGHT SOURCE CONTROL METHOD AND CAMERA APPARATUS THEREOF

BACKGROUND OF THE INVENTION

1. Field of the Invention

The present invention relates to a light source control method and a camera apparatus thereof, and more specifically, to a light source control method for comparing image reference values of practical images when each light source is turned on by turns with image reference values of corresponding uncompensated images respectively to control turning on or off of each light source respectively and a camera apparatus thereof.

2. Description of the Prior Art

In general, a camera apparatus for image surveillance usually utilizes a plurality of image capturers (e.g. four image capturers having a shooting field-of-view of 45°) to capture images, and then combines the images into one single image having a wide angle field-of-view (e.g. 180°) for a panoramic view. To be more specific, the plurality of image capturers could be movably disposed on the camera apparatus to allow that a user could adjust arrangement of the plurality of image capturers on the camera apparatus according to the practical surveillance needs. For example, the user could adjust the plurality of image capturers to be disposed on the camera apparatus in a radial arrangement to make the camera apparatus have a shooting field-of-view of 360% or could adjust the plurality of image capturers to be alternately disposed on a right-half periphery of the camera apparatus to make the camera apparatus have a shooting field-of-view of 180° for a right-half surveillance region of the camera apparatus.

In practical application, when image capturing of the image capturer needs additional compensation light (e.g. when the image capturer captures images in a dark environment), the camera apparatus turns on all the light sources (e.g. infrared light emitting diode) disposed around a periphery of the camera apparatus for providing sufficient compensation illumination. However, in the aforesaid light source control method, some light source completely misaligned with the image capturers movably disposed on the camera apparatus is still turned on even though it has no light compensation effect on image capturing of the camera apparatus (e.g. the light source located at a left-half periphery of the camera apparatus having no light compensation effect on image capturing of the images capturers alternately disposed on the right-half periphery of the camera apparatus), so as to increase power consumption of the camera apparatus.

SUMMARY OF THE INVENTION

The present invention provides a light source control method applied to a camera apparatus. The camera apparatus includes a device body, a plurality of image capturers, and a plurality of light sources. The plurality of image capturers is movably disposed on the device body. The plurality of light sources is disposed around the device body. The light source control method includes each image capturer capturing an uncompensated image toward a target region respectively when each light source is turned off, turning on the plurality of light sources by turns, each image capturer capturing a practical image toward the target region when each light source is turned on by turns, and comparing image reference values of the practical images captured by the plurality of image capturers when each light source is turned on by turns with image reference values of the corresponding uncompensated images respectively for controlling turning on or off of each light source respectively.

The present invention further provides a camera apparatus. The camera apparatus includes a device body, a plurality of image capturers, a plurality of light sources, a switch, and a processor. The plurality of image capturers is movably disposed on the device body. The plurality of light sources is disposed around the device body. The switch is electrically connected to the plurality of light sources for turning on or off the plurality of light sources. The processor is electrically connected to the plurality of image capturers and the switch for receiving uncompensated images respectively captured by the plurality of image capturers toward a target region when the switch turns off each light source, receiving practical images respectively captured by the plurality of image capturers toward the target region when the switch turns on each light source by turns, and comparing image reference values of the practical images captured by the plurality of image capturers when each light source is turned on by turns with image reference values of the corresponding uncompensated images respectively for controlling the switch to adjust turning on or off of each light source.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
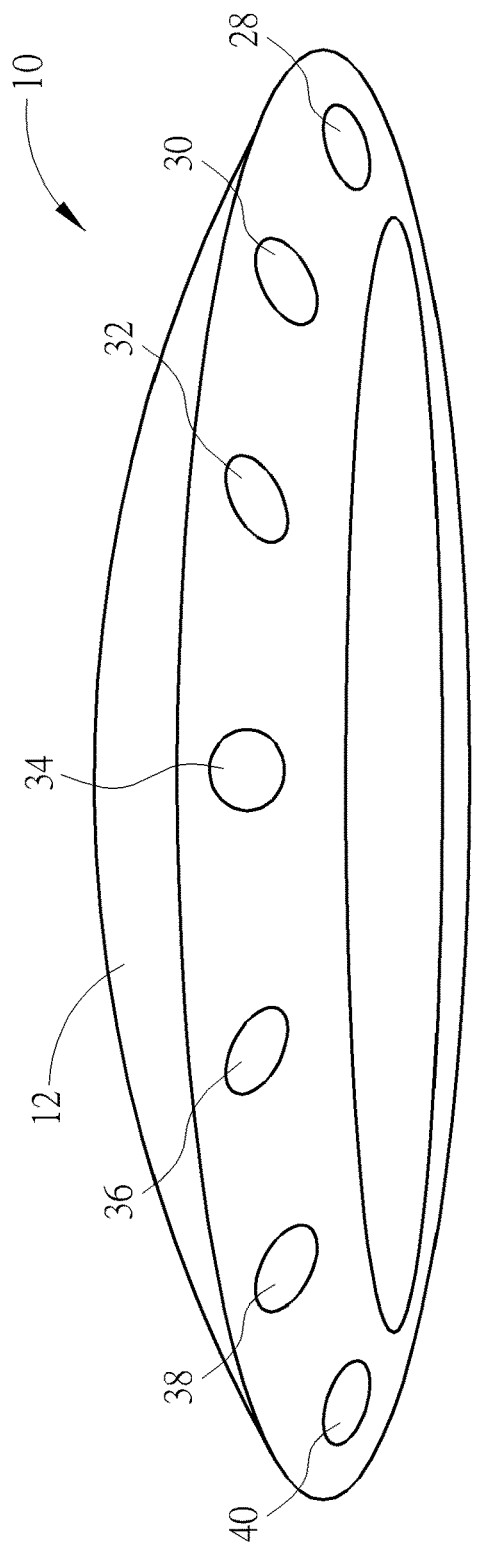
FIG. 1 is a diagram of a camera apparatus according to an embodiment of the present invention.
Figure 2:
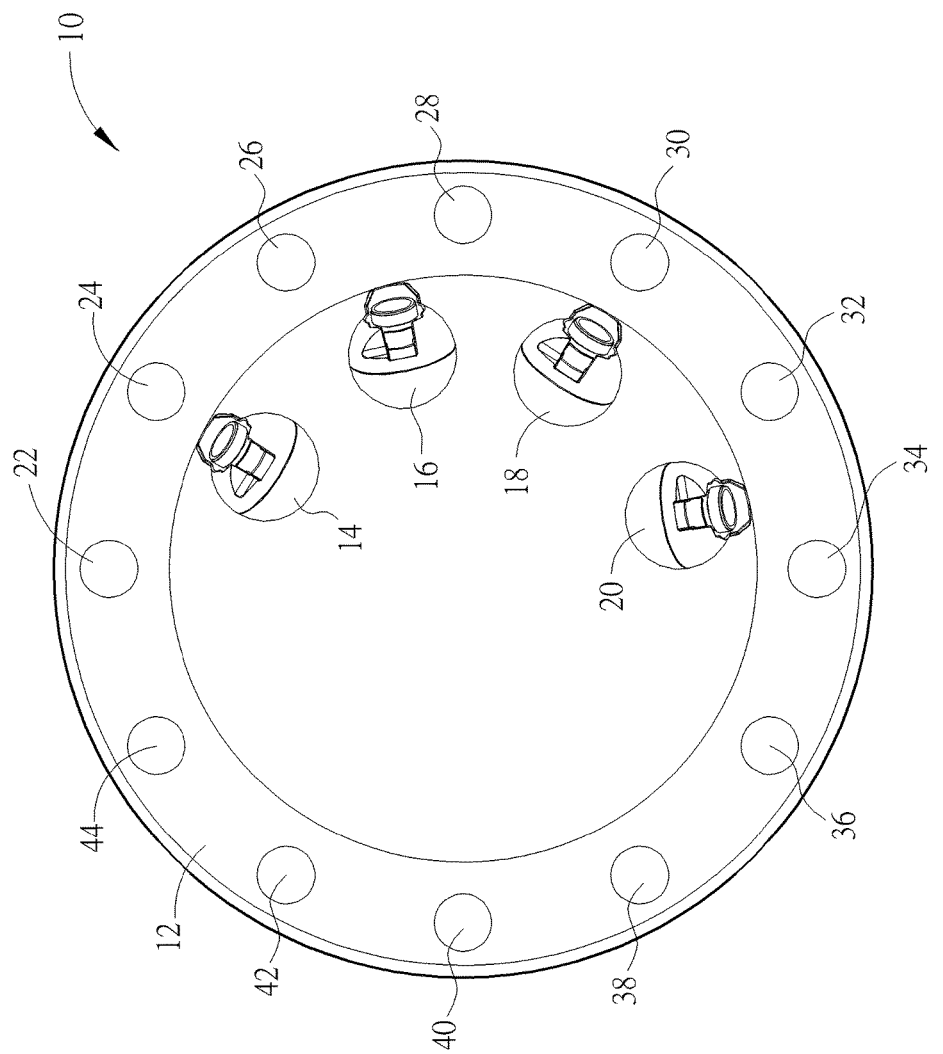
FIG. 2 is a bottom view of the camera apparatus in FIG. 1.
Figure 3:
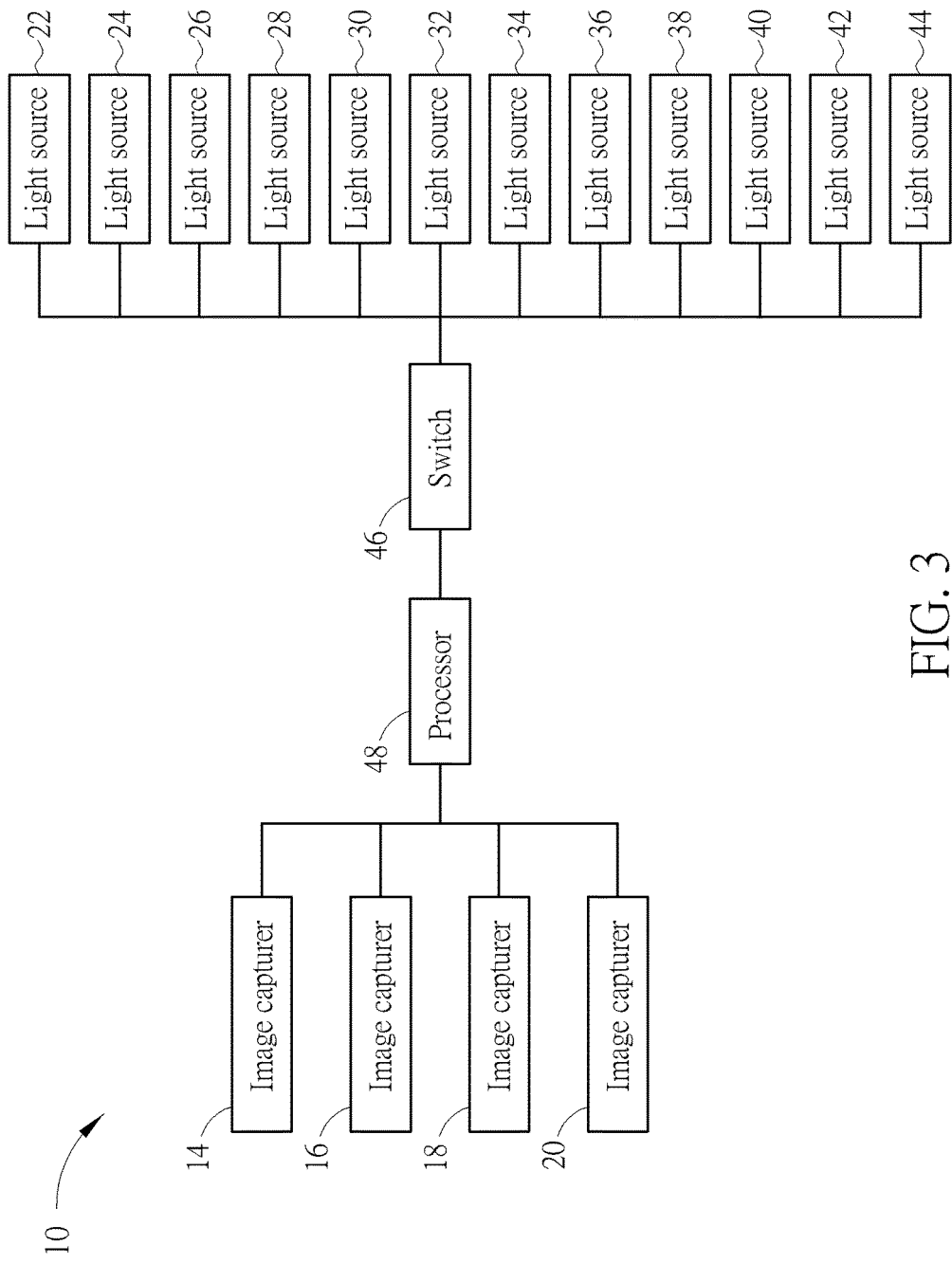
FIG. 3 is a functional block diagram of the camera apparatus in FIG. 1.

Please refer to FIG. 1, FIG. 2, and FIG. 3. FIG. 1 is a diagram of a camera apparatus 10 according to an embodiment of the present invention. FIG. 2 is a bottom view of the camera apparatus 10 in FIG. 1. FIG. 3 is a functional block diagram of the camera apparatus 10 in FIG. 1. As shown in FIG. 1, FIG. 2, and FIG. 3, the camera apparatus 10 includes a device body 12, a plurality of image capturers, a plurality of light sources, a switch 46 and a processor 48. There are four image capturers 14, 16, 18 and 20 shown in FIG. 2, but not limited thereto, meaning that amount of image capturers could be adjusted according to the practical application of the camera apparatus 10. There are twelve light sources 22, 24, 26, 28, 30, 32, 34, 36, 38, 40, 42 and 44 shown in FIG. 2, but not limited thereto, meaning that amount of light source could be adjusted according to the practical application of the camera apparatus 10. The image capturers 14, 16, 18, and 20 could preferably be a camera for image surveillance (e.g. IP camera), and are movably disposed on the device body 12 so that a user can operably adjust mounting positions of the image capturers 14, 16, 18 and 20 on the device body 12. Accordingly, after the user adjusts the mounting positions of the image capturers 14, 16, 18 and 20 on the device body 12, the image capturers 14, 16, 18 and 20 can be in a specific arrangement on the device body 12 to make the camera apparatus 10 have a corresponding shooting field of view. For example, as shown in FIG. 2, the image capturers 14, 16, 18 and 20 could be alternately disposed on a right-half periphery of the camera apparatus 10 in a radial arrangement to make the camera apparatus 10 have a shooting field of view of 180° for a right-half surveillance region of the camera apparatus 10, but not limited thereto. As for the related description for the movable mechanical design of the image capturers 14, 16, 18 and 20 on the device body 12, it is commonly seen in the prior art and omitted herein.

In this embodiment, the light sources 22, 24, 26, 28, 30, 32, 34, 36, 38, 40 and 42 could preferably be an infrared lighting module and are disposed around the device body 12 for providing compensation light, so that the camera apparatus 10 could still capture clear images via compensation light provided by the light sources 22, 24, 26, 28, 30, 32, 34, 36, 38, 40 and 42 even in a dark environment (e.g. road environmental surveillance at night). The switch 46 is electrically connected to the light sources 22, 24, 26, 28, 30, 32, 34, 36, 38, 40 and 42 for controlling turning on or off of the light sources 22, 24, 26, 28, 30, 32, 34, 36, 38, 40 and 42. The processor 48 could preferably be firmware, software, or hardware (e.g. SOC (System On Chip)) for image comparison, and are electrically connected to the image capturers 14, 16, 18 and 20 and the switch 46, for receiving uncompensated images respectively captured by the image capturers 14, 16, 18 and 20 toward a target region (e.g. a parking lot) when the switch 46 turns off each light source, receiving practical images respectively captured by the image capturers 14, 16, 18 and 20 toward the target region when the switch 46 turns on each light source by turns, and comparing image reference values of the practical images with image reference values of the corresponding uncompensated images respectively for controlling the switch 46 to adjust turning on or off of each light source.

Figure 4:
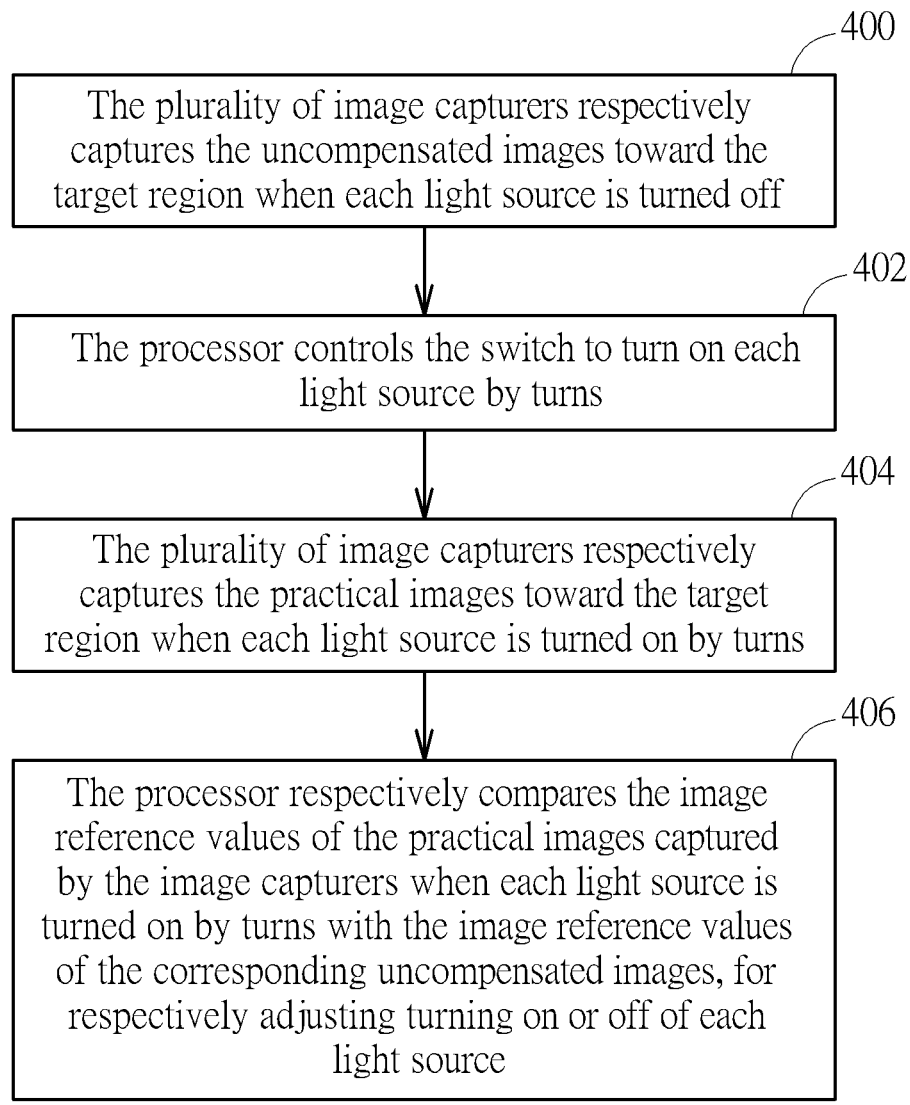
FIG. 4 is a flowchart of a light source control method according to an embodiment of the present invention.

The light source control method adopted by the camera apparatus 10 is described in detail as follows. Please refer to FIG. 1, FIG. 2, FIG. 3, and FIG. 4. FIG. 4 is a flowchart of the light source control method according to an embodiment of the present invention. The light source control method includes the following steps.

Step 400: The image capturers 14, 16, 18 and 20 respectively capture uncompensated images toward a target region when each light source is turned off.

Step 402: The processor 48 controls the switch 46 to turn on each light source by turns.

Step 404: The image capturers 14, 16, 18 and 20 respectively capture practical images toward the target region when each light source is turned on by turns.

Step 406: The processor 48 respectively compares image reference values of the practical images captured by the image capturers 14, 16, 18 and 20 when each light source is turned on by turns with image reference values of the corresponding uncompensated images, for respectively adjusting turning on or off of each light source.

More detailed description for the aforesaid steps is provided as follows in the condition that the image capturers 14, 16, 18 and 20 are alternately disposed on a right-half periphery of the camera apparatus 10 to make the camera apparatus 10 have a shooting field-of-view of about 180° for a right-half surveillance region of the camera apparatus 10. As for the related description for the light source control method for the image capturers 14, 16, 18 and 20 in other specific arrangements (e.g. the image capturers 14, 16, 18 and being disposed around the camera apparatus 10 in a radial arrangement to make the camera apparatus 10 have a shooting field-of-view of 360°), it could be reasoned by analogy according to the following description and omitted herein.

In Step 400, the image capturers 14, 16, 18 and 20 respectively capture the uncompensated images toward the right-half surveillance region of the camera apparatus 10 when the light sources 22, 24, 26, 28, 30, 32, 34, 36, 38, 40 and 42 are turned off. Subsequently, the processor 48 can control the switch 46 to turn on each light source by turns (Step 402), and then the image capturers 14, 16, 18 and 20 respectively capture the practical images toward the right-half surveillance region of the camera apparatus 10 when each light source is turned on by turns (Step 404). In practical application, the processor 48 can control the switch 46 to turn on each light source by turns in a specific sequence (could be predetermined by the camera apparatus 10 or defined by the user, such as clockwise or counterclockwise turning on each light source by turns).

After the aforesaid steps are performed, the processor 48 can compare the image reference values of the practical images captured by the image capturers 14, 16, 18 and 20 when each light source is turned on by turns with the image reference values of the corresponding uncompensated images respectively, for adjusting turning on or off of each light source (Step 406). The aforesaid image reference value could preferably include an exposure value (EV). To be more specific, in this embodiment, the exposure value could preferably include a shutter value, an aperture value, and a gain value (but not limited thereto). According to practical experience, if the light source has no light compensation effect on image capturing of the image capturer, at least one of the shutter value, the aperture value, and the gain value of the practical image captured by the image capturer is substantially equal to the at least one of the shutter value, the aperture value, and the gain value of the corresponding uncompensated image captured by the image capturer. On the contrary, if the light source has the light compensation effect on image capturing of the image capturer, the shutter value, the aperture value, and the gain value of the practical image are different from the shutter value, the aperture value, and the gain value of the corresponding uncompensated image respectively. In such a manner, the processor 48 can determine whether the light sources 22, 24, 26, 28, 30, 32, 34, 36, 38, 40 and 42 have the light compensation effect on image capturing of the image capturers 14, 16, 18 and 20 according to the aforesaid comparison result, and can control the switch 46 to adjust turning on or off of each light source accordingly, so as to achieve the purpose for reducing power consumption of the camera apparatus 10.

For example, it is assumed that the processor 48 controls the switch 46 to clockwise turn on the light sources 22, 24, 26, 28, 30, 32, 34, 36, 38, 40 and 42 by turns, the light sources 22, 24, 26, 28, 30, 30 and 34 close to the image capturers 14, 16, 18 and 20 as shown in FIG. 2 have the light compensation effect on image capturing of the camera apparatus 10, and the light sources 36, 38, 40 42 and 44 away from the image capturers 14, 16, 18 and 20 as shown in FIG. 2 have no light compensation effect on image capturing of the camera apparatus 10. In such a manner, during the processor 48 compares the exposure values of the practical images captured by the image capturers 14, 16, 18 and 20 when only the light source 22 is turned on (at this time, the light sources 24, 26, 28, 30, 32, 34, 36, 38, 40 and 42 are turned off) with the exposure values of the corresponding uncompensated images respectively, the processor 48 can detect that the shutter value, the aperture value, and the gain value of the practical image captured by the image capturer 14 are different from the shutter value, the aperture value, and the gain value of the corresponding uncompensated image respectively. Thus, the processor 48 can precisely determine that the light source 22 has the light compensation effect on image capturing of the image capturer 14 without detecting the position relationship between the light source 22 and the image capturer 14 in advance. Accordingly, the processor 48 can control the switch 46 to turn on the light source 22 to provide compensation light during the image capturer 14 captures images for image surveillance. Similarly, the processor 48 can also determine that the light sources 24, 26, 28, 30, 32 and 34 have the light compensation effect on image capturing of the image capturers 14, 16, 18 and 20 in the arrangement as shown in FIG. 2. The related description could be reasoned by analogy according to the aforesaid description and omitted herein.

On the other hand, the processor 48 can determine that the light source 36 has no light compensation effect on image capturing of the image capturers 14, 16, 18 and 20. In brief, during the processor 48 compares the exposure values of the practical images captured by the image capturers 14, 16, 18 and 20 when only the light source 36 is turned on with the exposure values of the corresponding uncompensated images respectively, the processor 48 detects that at least one of the shutter value, the aperture value, and the gain value of the practical image is substantially equal to the at least one of the shutter value, the aperture value, and the gain value of the corresponding uncompensated image (or the related difference is within an allowable range). Thus, the processor 48 can precisely determine that the light source 36 has no light compensation effect on image capturing of the image capturers 14, 16, 18 and 20 since the at least one of the shutter value, the aperture value, and the gain value of the practical image remains unchanged relative to the corresponding uncompensated image. Accordingly, the processor 48 can control the switch 46 to turnoff the light source 36 during the image capturers 14, 16, 18 and 20 capture images for image surveillance, so as to reduce power consumption of the camera apparatus 10. Similarly, the processor 48 can also detect that the light sources 38, 40, 42 and 44 have no light compensation effect on image capturing of the image capturers 14, 16, 18 and 20 in the arrangement as shown in FIG. 2. The related description could be reasoned by analogy according to the aforesaid description and omitted herein.

It should be mentioned that the image reference value adopted by the present invention is not limited to the exposure value mentioned in the aforesaid embodiment, meaning that the present invention could adopt other type of image reference value for determining whether the light source has the light compensation effect on image capturing of the image capturer, such as brightness value or bit rate, and the related description could be reasoned by analogy according to the aforementioned embodiment. In brief, in another embodiment that the brightness value (according to practical experience, the brightness value is positively related to the light compensation effect) is utilized as the image reference value for image comparison, the processor can detect that the brightness value of the practical image is less than or equal to the brightness value of the corresponding uncompensated image if the light source has no light compensation effect on image capturing of the image capturer. On the contrary, if the light source has the light compensation effect on image capturing of the image capturer, the processor can detect that the brightness value of the practical image is greater than the brightness value of the corresponding uncompensated image.

For example, during the processor 48 compares the brightness values of the practical images captured by the image capturers 14, 16, 18 and 20 when only the light source 22 is turned on with the brightness values of the corresponding uncompensated images respectively, the processor 48 can detect that the brightness value of the practical image captured by the image capturer 14 when only the light source 22 is turned on is greater than the brightness value of the corresponding uncompensated image captured by the image capturer 14. Thus, the processor 48 can precisely determine that the light source 22 has the light compensation effect on image capturing of the image capturer 14. According to the aforesaid brightness comparison process, the processor 48 can also determine that the light sources 24, 26, 28, 30, 32 and 34 have the light compensation effect on image capturing of the image capturers 14, 16, 18 and 20 in the arrangement as shown in FIG. 2.

On the other hand, during the processor 48 compares the brightness values of the practical images captured by the image capturers 14, 16, 18 and 20 when only the light source 36 is turned on with the brightness values of the corresponding uncompensated images respectively, the processor 48 can detect that the brightness values of the practical images captured by the image capturers 14, 16, 18 and 20 when only the light source 36 is turned on are less than or equal to the brightness values of the corresponding uncompensated images respectively. Thus, the processor 48 can precisely determine that the light source 36 has no light compensation effect on image capturing of the image capturers 14, 16, 18 and 20. According to the aforesaid brightness comparison process, the processor 48 can also determine that the light sources 38, 40, 42 and 44 have no light compensation effect on image capturing of the image capturers 14, 16, 18 and 20 in the arrangement as shown in FIG. 2.

Furthermore, in another embodiment, the bit rate could be utilized as the image reference value for image comparison. According to practical experience, the bit rate is negatively related to the light compensation effect. That is to say, if the light source has no light compensation effect on image capturing of the image capturer, the bit rate of the practical image is high since image noise of the practical image cannot be reduced by light provided from the light source, meaning that the bit rate of the practical image is greater than or equal to the bit rate of the corresponding uncompensated image. On the contrary, if the light source has the light compensation effect on image capturing of the image capturer, the bit rate of the practical image can be reduced since image noise of the practical image can be reduced by light provided from the light source, meaning that the bit rate of the practical image is less than the bit rate of the corresponding uncompensated image.

For example, during the processor 48 compares the bit rates of the practical images captured by the image capturers 14, 16, 18 and 20 when only the light source 22 is turned on with the bit rates of the corresponding uncompensated images respectively, the processor 48 can detect that the bit rate of the practical image captured by the image capturer 14 when only the light source 22 is turned on is less than the bit rate of the corresponding uncompensated image. Thus, the processor 48 can precisely determine that the light source 22 has the light compensation effect on image capturing of the image capturer 14. According to the aforesaid bit rate comparison process, the processor 48 can also determine that the light sources 24, 26, 28, 30, 32 and 34 have the light compensation effect on image capturing of the image capturers 14, 16, 18 and 20 in the arrangement as shown in FIG. 2.

On the other hand, during the processor 48 compares the bit rates of the practical images captured by the image capturers 14, 16, 18 and 20 when only the light source 36 is turned on with the bit rates of the corresponding uncompensated images respectively, the processor 48 can detect that the bit rates of the practical images captured by the image capturers 14, 16, 18 and 20 when only the light source 36 is turned on are greater than or equal to the bit rates of the corresponding uncompensated images respectively. Thus, the processor 48 can precisely determine that the light source 36 has no light compensation effect on image capturing of the image capturers 14, 16, 18 and 20. According to the aforesaid bit rate comparison process, the processor 48 can also determine that the light sources 38, 40, 42 and 44 have no light compensation effect on image capturing of the image capturers 14, 16, 18 and 20 in the arrangement as shown in FIG. 2.

In summary, compared with the prior art adopting the design that the camera apparatus turns on all the light sources when image capturing of the image capturer needs additional compensation light (e.g. when the image capturer captures images in a dark environment), the present invention adopts the design that the image reference values of the practical images captured by each image capturer when each light source is turned on by turns are compared with the image reference values of the corresponding uncompensated images respectively. Accordingly, the camera apparatus provided by the present invention can determine whether the light sources have the light compensation effect on image capturing of the image capturer based on the aforesaid comparison result, for respectively adjusting turning on or off of each light source during the image capturers capture images. In such a manner, the present invention can solve the prior art problem that the light source away from the image capturer is still turned on even though the light source has no light compensation effect on image capturing of the image capturer, so as to efficiently reduce power consumption of the camera apparatus for achieving the power saving purpose.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light source control method applied to a camera apparatus, the camera apparatus comprising a device body, a plurality of image capturers, and a plurality of light sources, the plurality of image capturers being movably disposed on the device body, the plurality of light sources being disposed around the device body, the light source control method comprising:

each image capturer capturing an uncompensated image toward a target region respectively when each light source is turned off;

turning on the plurality of light sources by turns;

each image capturer capturing a practical image toward the target region when each light source is turned on by turns; and comparing image reference values of the practical images captured by the plurality of image capturers when each light source is turned on by turns with image reference values of the corresponding uncompensated images respectively, for controlling turning on or off of each light source respectively.

2. The light source control method of claim 1, wherein the image reference value comprises an exposure value (EV), the exposure value comprises a shutter value, an aperture value, and a gain value, and the step of comparing the image reference values of the practical images captured by the plurality of image capturers when each light source is turned on by turns with the image reference values of the corresponding uncompensated images respectively for controlling turning on or off of each light source respectively comprises:

adjusting turning on or off of at least one light source when determining at least one of the shutter value, the aperture value, and the gain value of the practical image captured by each image capturer when the at least one light source is turned on is substantially equal to the at least one of the shutter value, the aperture value, and the gain value of the corresponding uncompensated image.

3. The light source control method of claim 1, wherein the image reference value comprises a brightness value, and the step of comparing the image reference values of the practical images captured by the plurality of image capturers when each light source is turned on by turns with the image reference values of the corresponding uncompensated images respectively for controlling turning on or off of each light source respectively comprises:

adjusting turning on or off of at least one light source when determining the brightness value of the practical image captured by each image capturer when the at least one light source is turned on is less than or equal to the brightness value of the corresponding uncompensated image.

4. The light source control method of claim 1, wherein the image reference value comprises a bit rate, and the step of comparing the image reference values of the practical images captured by the plurality of image capturers when each light source is turned on by turns with the image reference values of the corresponding uncompensated images respectively for controlling turning on or off of each light source respectively comprises:

adjusting turning on or off of at least one light source when determining the bit rate of the practical image captured by each image capturer when the at least one light source is turned on is greater than or equal to the bit rate of the corresponding uncompensated image.

5. A camera apparatus comprising:

a device body;

a plurality of image capturers movably disposed on the device body;

a plurality of light sources disposed around the device body;

a switch electrically connected to the plurality of light sources for turning on or off the plurality of light sources; and a processor electrically connected to the plurality of image capturers and the switch, for receiving uncompensated images respectively captured by the plurality of image capturers toward a target region when the switch turns off each light source, receiving practical images respectively captured by the plurality of image capturers toward the target region when the switch turns on each light source by turns, and comparing image reference values of the practical images captured by the plurality of image capturers when each light source is turned on by turns with image reference values of the corresponding uncompensated images respectively for controlling the switch to adjust turning on or off of each light source.

6. The camera apparatus of claim 5, wherein the image reference value comprises an exposure value, the exposure value comprises a shutter value, an aperture value, and a gain value, and the processor controls the switch to adjust turning on or off of at least one light source when determining at least one of the shutter value, the aperture value, and the gain value of the practical image captured by each image capturer when the at least one light source is turned on is substantially equal to the at least one of the shutter value, the aperture value, and the gain value of the corresponding uncompensated image.

7. The camera apparatus of claim 5, wherein the image reference value comprises a brightness value, and the processor controls the switch to adjust turning on or off of at least one light source when determining the brightness value of the practical image captured by each image capturer when the at least one light source is turned on is less than or equal to the brightness value of the corresponding uncompensated image.

8. The camera apparatus of claim 5, wherein the image reference value comprises a bit rate, and the processor controls the switch to adjust turning on or off of at least one light source when determining the bit rate of the practical image captured by each image capturer when the at least one light source is turned on is greater than or equal to the bit rate of the corresponding uncompensated image.

9. The camera apparatus of claim 5, wherein each light source is an infrared lighting module.

* * * * *